K. ROLLE AND J. F. HEINE.
GAS HEATED SOLDERING TOOL.
APPLICATION FILED SEPT 4, 1920.
1,383,859.
Patented July 5, 1921.
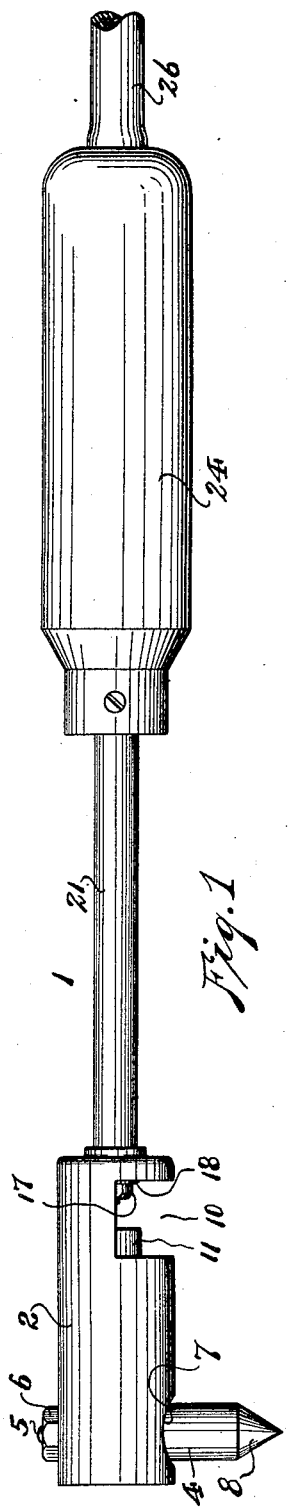
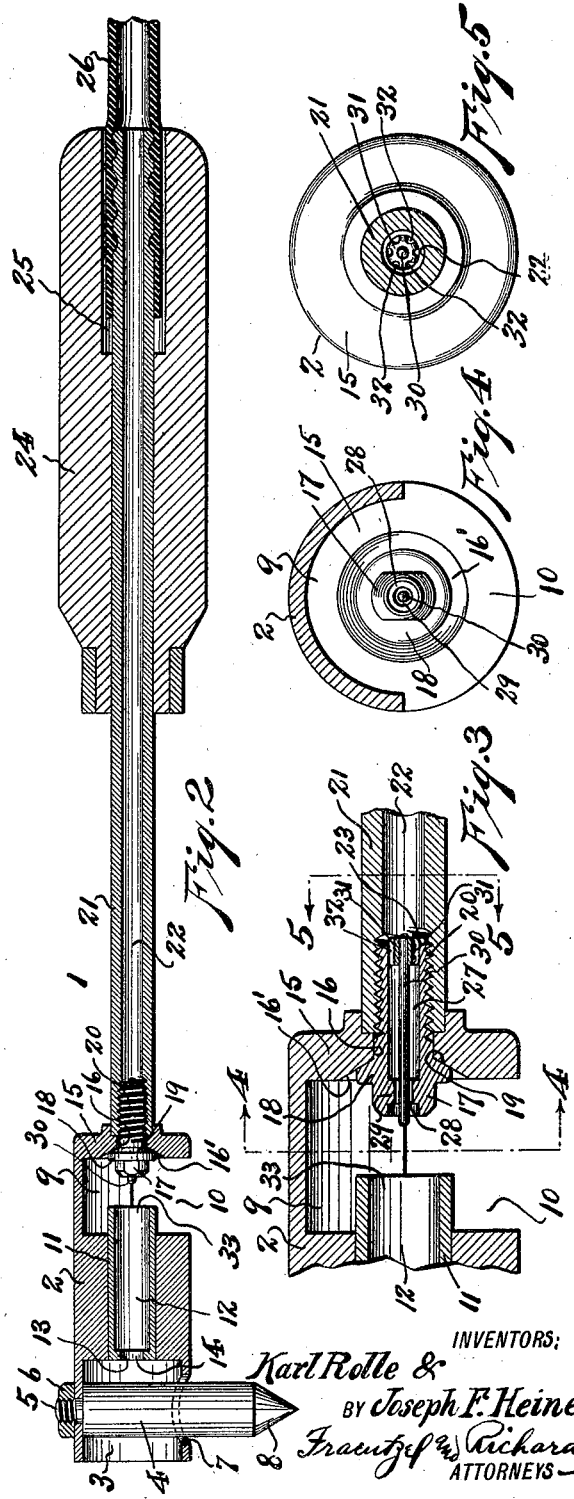
INVENTORS:
Karl Rolle &
BY Joseph F. Heine,
Fraentzel & Richards
ATTORNEYS

UNITED STATES PATENT OFFICE.

KARL ROLLE AND JOSEPH F. HEINE, OF NEWARK, NEW JERSEY.

GAS-HEATED SOLDERING-TOOL.

1,383,859.  Specification of Letters Patent.  Patented July 5, 1921.

Application filed September 4, 1920. Serial No. 408,208.

*To all whom it may concern:*

Be it known that we, KARL ROLLE and JOSEPH F. HEINE, citizens of the United States, residing at Newark, in the county of Essex and State of New Jersey, have invented certain new and useful Improvements in Gas-Heated Soldering-Tools; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in soldering tools; and, the invention has reference, more particularly, to a novel and efficient construction of gas-heated soldering iron.

The invention has for its principal object to provide a simple, cheap and efficient gas-heated soldering tool or iron, having means for connecting the same with a source of combustible gas, such, for example, as illuminating gas, and adapted to provide in combination with the soldering iron proper a novel construction of gas feed and burner having means for supplying to and intermixing with the gas sufficient air to assure comparatively high temperature combustion whereby heat is generated and properly applied to the soldering iron proper to render the same ready for use.

A further object of the invention is to provide a means for mounting the soldering iron proper so that not only is the generated heat directly and efficiently applied thereto, but the iron is also protected as far as possible against loss of heat by conductivity through the supporting or carrying means therefor.

Other objects of this invention, not here more particularly enumerated, will be clearly understood from the following detailed description of the same.

With the various objects of the invention in view, the same consists, primarily, in the novel construction of gas-heated soldering iron hereinafter more fully set forth; and the invention consists, furthermore, in the novel arrangements and combinations of the various devices and parts, as well as in the details of the construction of said parts, all of which will be more fully described in the following specification, and then finally embodied in the claims appended thereto.

The invention is clearly illustrated in the accompanying drawings, in which:—

Figure 1 is a side elevation of the novel soldering tool, made according to and embodying the principles of the present invention; Fig. 2 is a longitudinal vertical section of the same, with the gas jet element of the burner in elevation; Fig. 3 is a detail longitudinal section of a portion of the burner, showing the gas jet element in longitudinal section, said view being drawn on an enlarged scale; Fig. 4 is a detail transverse section, taken on line 4—4 in said Fig. 3; and Fig. 5 is another detail transverse section, taken on line 5—5 in said Fig. 3.

Similar characters of reference are employed in all of the hereinabove described views, to indicate corresponding parts.

Referring now to said drawings, the reference-character 1 indicates the complete gas-heated soldering iron, showing one embodiment of the invention made according to the principles thereof, the same comprising a main carrier member 2, preferably cylindrical in form, and provided at its outer end with an open ended combustion chamber 3. The reference-character 4 indicates a soldering iron element, provided at its butt with a threaded shank 5 of reduced diameter. The butt end of said soldering iron 4 is passed transversely upward through said combustion chamber 3, with its shank 5 projecting through the wall of the latter. A nut 6 is secured upon the exteriorly projecting end of said shank, to thereby securely retain the soldering iron in fixed position relative to the carrier member 2. The free end of said soldering iron 4 extends through an opening 7 provided in the opposite side of the wall of said combustion chamber 3, so that its nose 8 projects exteriorly from the latter. Said opening 7 is of a diameter somewhat larger than the diameter of said soldering iron, so that its margin is spaced away from the latter, whereby a minimum physical contact of the soldering iron with the carrier member 2 is provided to reduce to a minimum loss of heat by the soldering iron by conductivity through and radiation from the carrier member 2. The rear end of said carrier member is provided with an air induction chamber 9 which is open on its underside, as at 10. Supported by said carrier member 2, in longitudinal central extension between said air induction chamber 9 and said combustion chamber 3, is a tubular member 11 providing a mixing-chamber 12, the outlet end of which is reduced in diameter, by an internal annular shoulder 13 or otherwise, to provide a restricted burner opening 14. The rear end wall 15 of said carrier member 2 is provided with an axially or centrally alined longitudinal opening 16, provided at its inner end with an annularly chamfered or conical seat 16'.

The reference-character 17 indicates a gas discharge or jet member, which is provided adjacent to its discharge end with an exterior annular flange or shoulder 18 provided at its rear side with a conical face 19 adapted to be received in and seat itself upon said conical seat 16'. The rear end of said gas discharge or jet member 17 is provided with external screw-threads 20. In assembling the said gas discharge or jet member 17, its rear threaded end is inserted through the opening 16, so that its flange or shoulder 18 seats itself in the seat 16', in which position the extremity of said threaded rear end projects exteriorly rearward from the outer side of said end wall 15 of the carrier member 2, while its forward or discharge end projects into the air induction chamber 9 of said carrier member 2.

The reference-character 21 indicates a tubular handle shank, which provides in its interior a longitudinally extending gas passage 22. The forward end of said tubular handle shank 21 is provided with internal screw threads 23, which engage the threads 20 of said rearwardly projecting end of said gas discharge or jet member 17, so that said shank when screwed thereon, not only fixes the gas discharge or jet member in proper assembled relation, but also firmly connects the shank 21 with the carrier member 2, all of which will be clearly apparent from an inspection, more particularly, of Figs. 2 and 3 of the drawings.

Suitably fixed upon the rear end of said shank 21 is a handle member 24. Said handle member is provided at its rear end with an inwardly extending opening 25 concentric to the rear end of said shank 21, said opening 25 being of larger diameter than the diameter of said shank, so that the delivery end of a flexible gas conveying hose 26 may be inserted therein and suitably coupled with the shank 21 and connected in communication with the gas passage 22 thereof. Said gas conveying hose 26 is connected with any desired source of combustible gas, such as illuminating gas, so as to deliver the same to and through the gas passage 22, and thence discharge the same through the gas discharge or jet member 17.

The said gas discharge or jet member 17 is constructed to provide an internal longitudinal passage 27, which is restricted in diameter at or near its discharge end to provide a discharge opening 28 by means of the internal annular shoulder 29, or otherwise. In order to properly control the flow of gas, as discharged from said jet member 17, and so as to break the stream or jet of gas in a manner best assuring the quick and thorough intermixing of air therewith, there is provided a longitudinal jet stem 30, which is supported for central extension through the discharge opening 28, by means of a supporting block 31 fixed in the passage 27, and provided around its periphery with a plurality of grooved channels 32 forming inlet passages through which the gas enters into the jet member.

The intake end 33 of the tubular member 11 projects rearwardly into said air induction chamber 9 so as to be alined with but spaced a short distance forward of said discharge end of said gas discharge or jet member 17.

In using the novel construction of gas heated soldering tool, constructed as above described in detail, the functioning of the same is as follows:—

The combustible gas under suitable pressure is delivered through the hose 26 and gas passage 22 to the gas discharge or jet member 17. Since the discharge opening 28 of the gas discharge or jet member 17 is restricted relative to the gas delivery passages, the gas discharged therethrough will be accelerated at the discharge point, and by reason of the presence of the jet stem 30, will be discharged in an annular jet or stream possessing considerable velocity. The jet or stream of gas is directed by the discharge end of the jet member toward and into the intake end 33 of the member 11, and as the same enters therein at comparatively high velocity, its flow will induce with inspirational effect an accompanying flow of air from the air induction chamber 9 to pass therewith into the mixing chamber 12. The gas and air will thoroughly intermix together within said mixing chamber 12, and will be discharged through the burner opening 14 into the combustion chamber 3. The mixture of air and gas will be ignited within the combustion chamber 3 at the point of entrance thereinto, to wit, the burner opening 14, and will burn with a blue flame yielding a comparatively intense heat. The heat thus generated by the burning gas within the combustion chamber is circulated about the butt of the iron 4, so as to not only initially heat the same, but so as to also maintain the same at proper high temperature necessary to the desired functioning of the iron in performing the soldering operations.

It will be understood that the soldering iron 4 may be made in various shapes as to its operative or free end, to suit the same to the character of work desired to be performed therewith.

We are aware that some changes may be made in the arrangements and combinations of the several devices and parts, as well as in the details of the construction of the same, without departing from the scope of our present invention as above described, and as defined in the appended claims. Hence, we do not limit our invention to the exact arrangements and combinations of the several devices and parts as described in the said specification, nor do we confine ourselves to the exact details of the construction of the said parts, as illustrated in the accompanying drawings.

We claim:—

1. In a device of the kind described a carrier member provided with a combustion chamber at its outer end, a soldering iron fixed to extend through and project from said combustion chamber, a tubular member connected with the rear end of said carrier member provided with a gas passage, a handle on the free end of said tubular member, means for connecting said gas passage with a source of gas supply, said carrier member having an air induction chamber at its rear end, a gas discharge jet connected with said gas passage to enter said air induction chamber, and means for receiving and intermixing gas and air prior to delivery into said combustion chamber located intermediate said air induction chamber and said combustion chamber.

2. In a device of the kind described, a tubular member providing a gas delivery passage for connection with a source of gas supply; a handle portion on the rear end of said tubular member; a carrier member coupled with said tubular member provided with a combustion chamber at its forward end, an air induction chamber at its rearward end, and an intermediate and intercommunicating mixing chamber; a soldering iron fixed to extend transversely through and to project from said combusion chamber; a gas discharge jet connected with said tubular member to extend into said air induction chamber opposite the receiving end of said mixing chamber, said gas discharge jet having a restricted discharge opening, a central longitudinal jet stem projecting through said discharge opening, and means for supporting said jet stem.

3. In a device of the kind described, a tubular member providing a gas delivery passage for connection with a source of gas supply; a handle portion on the rear end of said tubular member; a carrier member provided with a combustion chamber at its forward end, an air induction chamber at its rearward end, and an intermediate and intercommunicating mixing chamber having a restricted burner opening; a soldering iron fixed to extend transversely through and to project from said combustion chamber, the rear end wall of said carrier member having a central opening provided at its inner end with an annular conical seat; a gas discharge jet having an annular shoulder adjacent to its discharge end and rearwardly extending externally threaded shank, said shank passing rearwardly through said central opening with said shoulder engaged in said seat while said shank being threaded into the end of said tubular member to thereby interconnect said tubular member and said carrier member, and the discharge end of said gas discharge jet projecting into said air induction chamber opposite the receiving end of said mixing chamber.

4. In a device of the kind described, a tubular member providing a gas delivery passage for connection with a source of gas supply; a handle portion on the rear end of said tubular member; a carrier member provided with a combustion chamber at its forward end, an air induction chamber at its rearward end, and an intermediate and intercommunicating mixing chamber having a restricted burner opening; a soldering iron fixed to extend transversely through and to project from said combustion chamber, the rear end wall of said carrier member having a central opening provided at its inner end with an annular conical seat; a gas discharge jet having an annular shoulder adjacent to its discharge end and rearwardly extending externally threaded shank, said shank passing rearwardly through said central opening with said shoulder engaged in said seat while said shank being threaded into the end of said tubular member to thereby interconnect said tubular member and said carrier member, the discharge end of said gas discharge jet projecting into said air induction chamber opposite the receiving end of said mixing chamber, said gas discharge jet having a restricted discharge opening, a central longitudinal jet stem projecting through said discharge opening, and means for supporting said jet stem.

In testimony that we claim the invention set forth above we have hereunto set our hands this 2nd day of September, 1920.

KARL ROLLE.
JOSEPH F. HEINE.

Witnesses:
GEORGE D. RICHARDS,
BARBARA W. SUTTERLIN.